United States Patent
Nonoyama

(10) Patent No.: US 11,784,328 B2
(45) Date of Patent: Oct. 10, 2023

(54) AIR-COOLED FUEL CELL SYSTEM

(71) Applicant: TOYOTA JIDOSHA KABUSHIKI KAISHA, Toyota (JP)

(72) Inventor: Nobuaki Nonoyama, Chiryu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/804,848

(22) Filed: May 31, 2022

(65) Prior Publication Data

US 2022/0393193 A1    Dec. 8, 2022

(30) Foreign Application Priority Data

Jun. 2, 2021    (JP) ................................ 2021-092787

(51) Int. Cl.
*H01M 8/04*         (2016.01)
*H01M 8/04014*      (2016.01)
*H01M 8/04858*      (2016.01)
*H01M 8/0432*       (2016.01)

(52) U.S. Cl.
CPC ... *H01M 8/04014* (2013.01); *H01M 8/04358* (2013.01); *H01M 8/04932* (2013.01); *H01M 2250/20* (2013.01)

(58) Field of Classification Search
CPC .......... H01M 8/0414; H01M 8/04358; H01M 8/04932; H01M 2250/20
USPC ....................................................... 429/439
See application file for complete search history.

(56) References Cited

U.S. PATENT DOCUMENTS

| | | | |
|---|---|---|---|
| 2011/0067422 A1* | 3/2011 | Ichishi | B60H 3/0085 62/176.1 |
| 2012/0152511 A1* | 6/2012 | Chang | B60H 1/00478 165/10 |
| 2015/0136352 A1* | 5/2015 | Paganelli | G01F 15/061 165/11.1 |
| 2017/0125866 A1* | 5/2017 | Zhou | H01M 8/04067 |
| 2019/0292973 A1* | 9/2019 | Jiang | F01P 7/14 |

FOREIGN PATENT DOCUMENTS

| | | |
|---|---|---|
| JP | 2008123960 A | 5/2008 |
| JP | 2018106831 A | 7/2018 |
| JP | 2018116861 A | 7/2018 |

* cited by examiner

*Primary Examiner* — James M Erwin
(74) *Attorney, Agent, or Firm* — Hunton Andrews Kurth LLP

(57) ABSTRACT

To provide an air-cooled fuel cell system configured to suppress thermal runaway. An air-cooled fuel cell system, wherein the air-cooled fuel cell system comprises: a fuel cell, a first temperature acquirer, a second temperature acquirer and a controller; wherein the fuel cell comprises a cooling fin made of a metal; wherein the first temperature acquirer is disposed at a position which is near a cooling air inlet of the fuel cell and which is apart from the cooling fin; wherein the second temperature acquirer is disposed to come into contact with the cooling fin; wherein the controller monitors temperatures acquired by the first and second temperature acquirers.

2 Claims, 4 Drawing Sheets

AIR-COOLED FUEL CELL SYSTEM

CROSS-REFERENCE TO RELATED APPLICATION

This application claims priority to Japanese Patent Application No. 2021-092787 filed on Jun. 2, 2021, which is incorporated herein by reference in its entirety.

TECHNICAL FIELD

The disclosure relates to an air-cooled fuel cell system.

BACKGROUND

A fuel cell (FC) is a power generation device which is composed of a single unit fuel cell (hereinafter, it may be referred to as "cell") or a fuel cell stack composed of stacked unit fuel cells (hereinafter, it may be referred to as "stack") and which generates electrical energy by electrochemical reaction between fuel gas (e.g., hydrogen) and oxidant gas (e.g., oxygen). In many cases, the fuel gas and oxidant gas actually supplied to the fuel cell, are mixtures with gases that do not contribute to oxidation and reduction. Especially, the oxidant gas is often air containing oxygen.

Hereinafter, fuel gas and oxidant gas may be collectively and simply referred to as "reaction gas" or "gas". Also, a single unit fuel cell and a fuel cell stack composed of stacked unit cells may be referred to as "fuel cell".

Various techniques relating to fuel cells mounted and used in fuel cell electric vehicles (hereinafter may be referred to as "vehicle") were proposed.

For Example, Patent Literature 1 discloses a novel air-cooled fuel cell unit in which cooling effect is improved by temperature equalization of an FC stack on the suction side and the exhaust side.

Patent Literature 2 discloses a fuel battery capable of detection of an appropriate cell temperature.

Patent Literature 3 discloses a fuel cell which makes it possible to detect various abnormalities that invite the decline of power generation ability at a local level in an early stage and to promptly specify causes for the abnormalities and take measures.

Patent Literature 1: Japanese Patent Application Laid-Open (JP-A) No. 2018-106831
Patent Literature 2: JP-A No. 2018-116861
Patent Literature 3: JP-A No. 2008-123960

For stable power generation, it is generally needed to control the temperature of a fuel cell at 100° C. or less, depending on the materials of the components constituting the fuel cell. Accordingly, to check if power generation reaction is efficiently performed, and to check if the fuel cell temperature is not such a high temperature that causes a problem for the fuel cell components, it is very important to accurately grasp the fuel cell temperature.

The air-cooled fuel cell unit of Patent Literature 1 is a control to maintain a desired power generation state, and it cannot determine whether or not it falls into an abnormal state such as overheating, and it cannot cope with the state.

SUMMARY

The present disclosure was achieved in light of the above circumstances. An object of the present disclosure is to provide an air-cooled fuel cell system configured to suppress thermal runaway.

The air-cooled fuel cell system of the present disclosure is an air-cooled fuel cell system,
wherein the air-cooled fuel cell system comprises:
a fuel cell,
a first temperature acquirer,
a second temperature acquirer and
a controller;
wherein the fuel cell comprises a cooling fin made of a metal;
wherein the first temperature acquirer is disposed at a position which is near a cooling air inlet of the fuel cell and which is apart from the cooling fin;
wherein the second temperature acquirer is disposed to come into contact with the cooling fin;
wherein the controller monitors temperatures acquired by the first and second temperature acquirers; and
wherein, when a difference between the temperatures acquired by the first and second temperature acquirers is a predetermined temperature threshold or more, or when a difference between temperature increase rates acquired by the first and second temperature acquirers is a predetermined temperature increase rate threshold or more, the controller stops power generation of the fuel cell.

The air-cooled fuel cell system of the present disclosure may be the air-cooled fuel cell system,
wherein the air-cooled fuel cell system further comprises:
an air introducer configured to take in air from the outside of the air-cooled fuel cell system,
a reaction air supplier configured to supply reaction air to the fuel cell,
a reaction air supply flow path configured to connect the reaction air supplier and a reaction air inlet of the fuel cell,
a reaction air discharge flow path configured to connect a reaction air outlet of the fuel cell and the outside,
a cooling air supply flow path configured to connect the air introducer and the cooling air inlet of the fuel cell,
a fuel gas supplier configured to supply fuel gas to the fuel cell,
a fuel gas supply flow path configured to connect the fuel gas supplier and a fuel gas inlet of the fuel cell, and
a fuel off-gas discharge flow path configured to connect a fuel gas outlet of the fuel cell and the outside;
wherein the fuel cell has a structure that a reaction air manifold and a cooling air manifold are independent of each other;
wherein the reaction air supply flow path comprises a first valve in a region downstream of the reaction air supplier and upstream of the reaction air inlet of the fuel cell;
wherein the reaction air discharge flow path comprises a second valve downstream of the reaction air outlet of the fuel cell;
wherein the fuel gas supply flow path comprises a third valve upstream of the fuel gas inlet of the fuel cell;
wherein the fuel off-gas discharge flow path comprises a fourth valve downstream of the fuel gas outlet of the fuel cell; and
wherein, when a difference between the temperatures acquired by the first and second temperature acquirers is a predetermined temperature threshold or more, or when a difference between temperature increase rates acquired by the first and second temperature acquirers is a predetermined temperature increase rate threshold or more, the controller decreases opening degrees of the first, second, third and fourth valves.

According to the air-cooled fuel cell system of the present disclosure, thermal runaway is suppressed.

BRIEF DESCRIPTION OF THE DRAWINGS

In the accompanying drawings.

DETAILED DESCRIPTION

Figure 1:
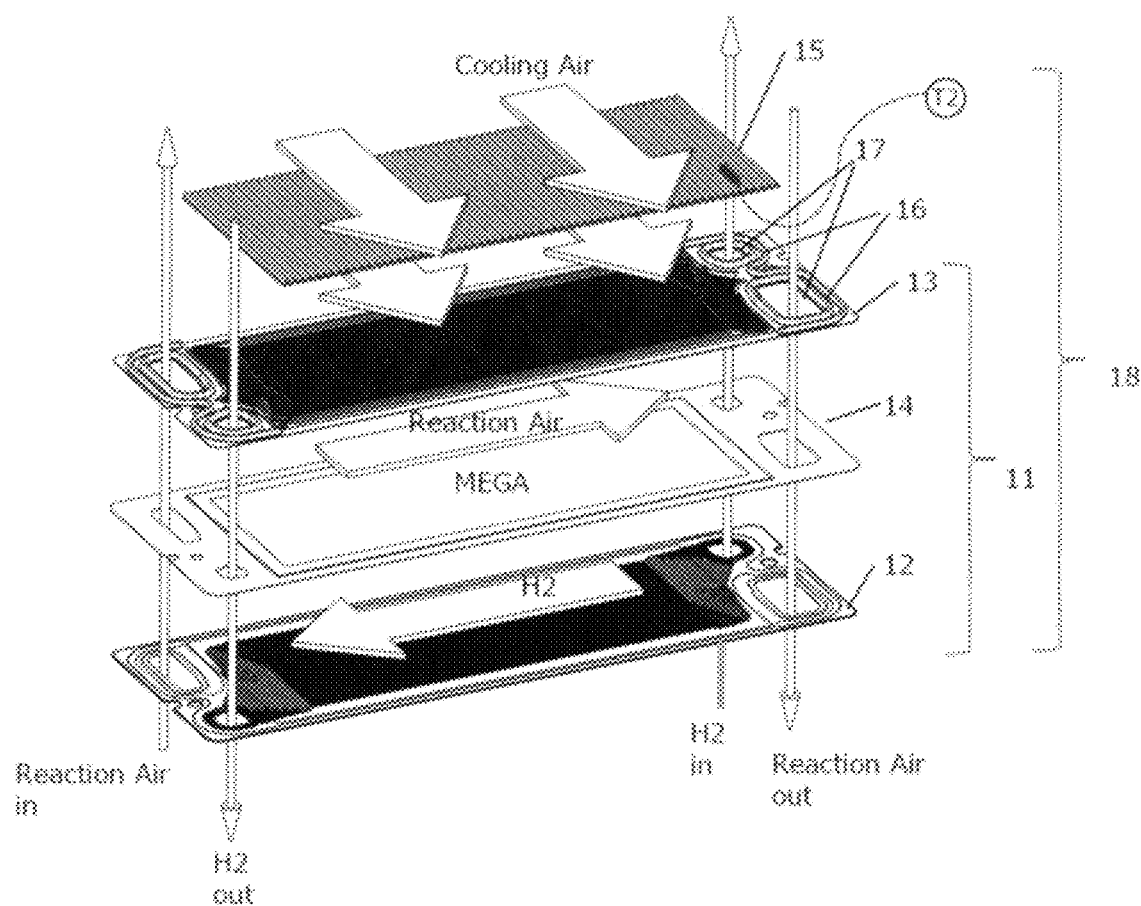
FIG. 1 is an exploded perspective view of an example of a part of the fuel cell of the present disclosure.

The air-cooled fuel cell system of the present disclosure is an air-cooled fuel cell system,
wherein the air-cooled fuel cell system comprises:
a fuel cell,
a first temperature acquirer,
a second temperature acquirer and
a controller;
wherein the fuel cell comprises a cooling fin made of a metal;
wherein the first temperature acquirer is disposed at a position which is near a cooling air inlet of the fuel cell and which is apart from the cooling fin;
wherein the second temperature acquirer is disposed to come into contact with the cooling fin;
wherein the controller monitors temperatures acquired by the first and second temperature acquirers; and
wherein, when a difference between the temperatures acquired by the first and second temperature acquirers is a predetermined temperature threshold or more, or when a difference between temperature increase rates acquired by the first and second temperature acquirers is a predetermined temperature increase rate threshold or more, the controller stops power generation of the fuel cell.

An air-cooled fuel cell has small heat capacity compared to a water-cooled fuel cell. Since air has poor heat transfer, there is a high risk of overheating under abnormal situations such as a decrease in cooling air flow rate. It is important to quickly detect the risk and safely control the power generation of the fuel cell.

For a water-cooled fuel cell, due to high heat transfer of water and large heat capacity of the fuel cell, the temperature increase rate is slow. Accordingly, unlike the air-cooled fuel cell, the need for the quick detection is low.

According to the present disclosure, by monitoring the difference between the temperature of the air not exposed to the fuel cell and the temperature of the air inside the fuel cell, an abnormality inside the fuel cell in a power generation state is easily detected with accuracy, and the presence of an abnormality in the fuel cell is determined from the temperature difference.

By the present disclosure, the difference between the temperatures of the inside and outside of the air-cooled fuel cell or the difference between the temperature increase rates thereof is accurately grasped. Accordingly, overheating is quickly detected in the air-cooled fuel cell in which the refrigerant has small heat capacity, and thermal runaway is prevented in advance or suppressed.

In the air temperature measurement outside the air-cooled fuel cell, due to poor heat transfer, it takes time to detect an abnormality. According to the present disclosure, by employing the structure that the temperature sensors are in direct contact with the cooling fin made of a metal, even when the supply of cooling air is stopped, the temperature of the fuel cell is grasped with accuracy by directly measuring the temperature of the cooling fin.

The fuel cell system of the present disclosure is the air-cooled fuel cell system.

The air-cooled fuel cell system uses air as the refrigerant. In the present disclosure, air used as the refrigerant may be referred to as "cooling air". Also in the present disclosure, air used as the oxidant gas may be referred to as "reaction air".

The air-cooled fuel cell system includes the fuel cell, the first temperature acquirer, the second temperature acquirer, the controller and so on.

The fuel cell generally includes a unit fuel cell.

The fuel cell may be a fuel cell composed of a single unit fuel cell, or it may be a fuel cell stack composed of stacked unit fuel cells.

The number of the stacked unit fuel cells is not particularly limited. For example, 2 to several hundred unit fuel cells may be stacked; 20 to 600 unit fuel cells may be stacked; or 40 to 200 unit fuel cells may be stacked.

At both stacking-direction ends of each unit fuel cell, the fuel cell stack may include an end plate, a collector plate, a pressure plate and the like.

Each unit fuel cell may include a membrane electrode gas diffusion layer assembly (MEGA). Each unit fuel cell may include first and second separators sandwiching the membrane electrode gas diffusion layer assembly.

The membrane electrode gas diffusion layer assembly includes a first gas diffusion layer, a first catalyst layer, an electrolyte membrane, a second catalyst layer and a second gas diffusion layer in this order.

More specifically, the membrane electrode gas diffusion layer assembly includes an anode-side gas diffusion layer, an anode catalyst layer, an electrolyte membrane, a cathode catalyst layer and a cathode-side gas diffusion layer in this order.

One of the first and second catalyst layers is the cathode catalyst layer, and the other is the anode catalyst layer.

The cathode (oxidant electrode) includes the cathode catalyst layer and the cathode-side gas diffusion layer.

The anode (fuel electrode) includes the anode catalyst layer and the anode-side gas diffusion layer.

The first catalyst layer and the second catalyst layer are collectively referred to as "catalyst layer". The cathode catalyst layer and the anode catalyst layer are collectively referred to as "catalyst layer".

One of the first gas diffusion layer and the second gas diffusion layer is the cathode-side gas diffusion layer, and the other is the anode-side gas diffusion layer.

The first gas diffusion layer is the cathode-side gas diffusion layer when the first catalyst layer is the cathode catalyst layer. The first gas diffusion layer is the anode-side gas diffusion layer when the first catalyst layer is the anode catalyst layer.

The second gas diffusion layer is the cathode-side gas diffusion layer when the second catalyst layer is the cathode catalyst layer. The second gas diffusion layer is the anode-side gas diffusion layer when the second catalyst layer is the anode catalyst layer.

The first gas diffusion layer and the second gas diffusion layer are collectively referred to as "gas diffusion layer" or "diffusion layer". The cathode-side gas diffusion layer and the anode-side gas diffusion layer are collectively referred to as "gas diffusion layer" or "diffusion layer".

The gas diffusion layer may be a gas-permeable electroconductive member or the like.

As the electroconductive member, examples include, but are not limited to, a porous carbon material such as carbon cloth and carbon paper, and a porous metal material such as metal mesh and foam metal.

The fuel cell may include a microporous layer (MPL) between the catalyst layer and the gas diffusion layer. The microporous layer may contain a mixture of a water repellent resin such as PTFE and an electroconductive material such as carbon black.

The electrolyte membrane may be a solid polymer electrolyte membrane. As the solid polymer electrolyte membrane, examples include, but are not limited to, a hydrocarbon electrolyte membrane and a fluorine electrolyte membrane such as a thin, moisture-containing perfluorosulfonic acid membrane. The electrolyte membrane may be a Nafion membrane (manufactured by DuPont Co., Ltd.), for example.

One of the first separator and the second separator is the cathode-side separator, and the other is the anode-side separator.

The first separator is the cathode-side separator when the first catalyst layer is the cathode catalyst layer. The first separator is the anode-side separator when the first catalyst layer is the anode catalyst layer.

The second separator is the cathode-side separator when the second catalyst layer is the cathode catalyst layer. The second separator is the anode-side separator when the second catalyst layer is the anode catalyst layer.

The first separator and the second separator are collectively referred to as "separator". The anode-side separator and the cathode-side separator are collectively referred to as "separator".

The membrane electrode gas diffusion layer assembly is sandwiched by the first separator and the second separator.

The separator may include supply and discharge holes for allowing the fluid such as the reaction gas and the refrigerant to flow in the stacking direction of the unit fuel cells. When the refrigerant is gas, for example, cooling air may be used as the refrigerant.

As the supply hole, examples include, but are not limited to, a fuel gas supply hole, an oxidant gas supply hole, and a refrigerant supply hole.

As the discharge hole, examples include, but are not limited to, a fuel gas discharge hole, an oxidant gas discharge hole, and a refrigerant discharge hole.

The separator may include one or more fuel gas supply holes, one or more oxidant gas supply holes, one or more refrigerant supply holes as needed, one or more fuel gas discharge holes, one or more oxidant gas discharge holes, and one or more refrigerant discharge holes as needed.

The separator may include a reaction gas flow path on a surface in contact with the gas diffusion layer. Also, the separator may include a refrigerant flow path for keeping the fuel cell temperature constant, on the surface opposite to the surface in contact with the gas diffusion layer.

When the separator is the anode-side separator, it may include one or more fuel gas supply holes, one or more oxidant gas supply holes, one or more refrigerant supply holes as needed, one or more fuel gas discharge holes, one or more oxidant gas discharge holes, and one or more refrigerant discharge holes as needed. The anode-side separator may include a fuel gas flow path for allowing the fuel gas to flow from the fuel gas supply hole to the fuel gas discharge hole, on the surface in contact with the anode-side gas diffusion layer. As needed, the anode-side separator may include a refrigerant flow path for allowing the refrigerant to from the refrigerant supply hole to the refrigerant discharge hole, on the surface opposite to the surface in contact with the anode-side gas diffusion layer.

When the separator is the cathode-side separator, it may include one or more fuel gas supply holes, one or more oxidant gas supply holes, one or more refrigerant supply holes as needed, one or more fuel gas discharge holes, one or more oxidant gas discharge holes, and one or more refrigerant discharge holes as needed. The cathode-side separator may include an oxidant gas flow path for allowing the oxidant gas to flow from the oxidant gas supply hole to the oxidant gas discharge hole, on the surface in contact with the cathode-side gas diffusion layer. As needed, the cathode-side separator may include a refrigerant flow path for allowing the refrigerant to flow from the refrigerant supply hole to the refrigerant discharge hole, on the surface opposite to the surface in contact with the cathode-side gas diffusion layer.

The separator may be a gas-impermeable electroconductive member or the like. As the electroconductive member, examples include, but are not limited to, a resin material such as thermosetting resin, thermoplastic resin and resin fiber, a carbon composite material obtained by press-molding a mixture containing a carbonaceous material such as carbon powder and carbon fiber, gas-impermeable dense carbon obtained by carbon densification, and a metal plate (such as a titanium plate, an iron plate, an aluminum plate and a stainless-steel (SUS) plate) obtained by press-molding. The separator may function as a collector.

The shape of the separator may be a rectangular shape, a horizontal hexagon shape, a horizontal octagon shape, a circular shape or a long circular shape, for example.

The fuel cell may include a manifold such as an inlet manifold communicating between the supply holes and an outlet manifold communicating between the discharge holes.

As the inlet manifold, examples include, but are not limited to, an anode inlet manifold, a reaction air inlet manifold (a cathode inlet manifold) and a cooling air inlet manifold.

As the outlet manifold, examples include, but are not limited to, an anode outlet manifold, a reaction air outlet manifold (a cathode outlet manifold) and a cooling air outlet manifold.

In the present disclosure, the reaction air inlet manifold (the cathode inlet manifold) and the reaction air outlet manifold (the cathode outlet manifold) are collectively referred to as "reaction air manifold".

Also in the present disclosure, the cooling air inlet manifold and the cooling air outlet manifold are collectively referred to as "cooling air manifold".

The fuel cell has the structure that the reaction air manifold and the cooling air manifold are independent of each other.

In the present disclosure, the fuel gas and the oxidant gas are collectively referred to as "reaction gas". The reaction gas supplied to the anode is the fuel gas, and the reaction gas supplied to the cathode is the oxidant gas. The fuel gas is a gas mainly containing hydrogen, and it may be hydrogen. The oxidant gas may be oxygen, air, dry air or the like.

The fuel cell may include a resin frame.

The resin frame may be disposed in the periphery of the membrane electrode gas diffusion layer assembly and may be disposed between the first separator and the second separator.

The resin frame may be a component for preventing cross leakage or a short circuit between the catalyst layers of the membrane electrode gas diffusion layer assembly.

The resin frame may include a skeleton, an opening, supply holes and discharge holes.

The skeleton is a main part of the resin frame, and it connects to the membrane electrode gas diffusion layer assembly.

The opening is a region retaining the membrane electrode gas diffusion layer assembly, and it is also a through-hole penetrating a part of the skeleton to set the membrane electrode gas diffusion layer assembly therein. In the resin frame, the opening may be disposed in the position where the skeleton is disposed around (in the periphery) of the membrane electrode gas diffusion layer assembly, or it may be disposed in the center of the resin frame.

The supply and discharge holes allows the reaction gas, the refrigerant and the like to flow in the stacking direction of the unit fuel cells. The supply holes of the resin frame may be aligned and disposed to communicate with the supply holes of the separator. The discharge holes of the resin frame may be aligned and disposed to communicate with the discharge holes of the separator.

The resin frame may include a frame-shaped core layer and two frame-shaped shell layers disposed on both surfaces of the core layer, that is, a first shell layer and a second shell layer.

Like the core layer, the first shell layer and the second shell layer may be disposed in a frame shape on both surfaces of the core layer.

The core layer may be a structural member which has gas sealing properties and insulating properties. The core layer may be formed of a material such that the structure is unchanged at the temperature of hot pressing in a fuel cell production process. As the material for the core layer, examples include, but are not limited to, resins such as polyethylene, polypropylene, polycarbonate (PC), polyphenylene sulfide (PPS), polyethylene terephthalate (PET), polyethylene naphthalate (PEN), polyamide (PA), polyimide (PI), polystyrene (PS), polyphenylene ether (PPE), polyether ether ketone (PEEK), cycloolefin, polyethersulfone (PES), polyphenylsulfone (PPSU), liquid crystal polymer (LCP) and epoxy resin. The material for the core layer may be a rubber material such as ethylene propylene diene rubber (EPDM), fluorine-based rubber and silicon-based rubber.

From the viewpoint of ensuring insulating properties, the thickness of the core layer may be 5 µm or more, or it may be 30 µm or more. From the viewpoint of reducing the cell thickness, the thickness of the core layer may be 200 µm or less, or it may be 150 µm or less.

To attach the core layer to the anode-side and cathode-side separators and to ensure sealing properties, the first shell layer and the second shell layer may have the following properties: the first and second shell layers have high adhesion to other substances; they are softened at the temperature of hot pressing; and they have lower viscosity and lower melting point than the core layer. More specifically, the first shell layer and the second shell layer may be thermoplastic resin such as polyester-based resin and modified olefin-based resin, or they may be thermosetting resin such as modified epoxy resin. The first shell layer and the second shell layer may be the same kind of resin as the adhesive layer.

The resin for forming the first shell layer and the resin for forming the second shell layer may be the same kind of resin, or they may be different kinds of resins. By disposing the shell layers on both surfaces of the core layer, it becomes easy to attach the resin frame and the two separators by hot pressing.

From the viewpoint of ensuring adhesion, the thickness of the first and second shell layers may be 5 µm or more, or it may be 20 µm or more. From the viewpoint of reducing the cell thickness, the thickness of the first and second shall layers may be 100 µm or less, or it may be 40 µm or less.

In the resin frame, the first shell layer may be disposed only at a part that is attached to the anode-side separator, and the second shell layer may be disposed only at a part attached to the cathode-side separator. The first shell layer disposed on one surface of the core layer may be attached to the cathode-side separator. The second shell layer disposed on the other surface of the core layer may be attached to the anode-side separator. The resin frame may be sandwiched by the pair of separators.

The fuel cell may include a gasket between adjacent unit fuel cells.

The material for the gasket may be ethylene propylene diene monomer (EPDM) rubber, silicon rubber, thermoplastic elastomer resin or the like.

The fuel cell includes the cooling fin made of a metal. As the metal, examples include, but are not limited to, Al, Ti and SUS. The fuel cell may include the cooling fin between the adjacent unit fuel cells.

For example, when the separator is made of a carbon composite material, the heat conduction of the separator is worse than a separator made of a metal material. However, by disposing the cooling fin made of a metal, widespread abnormal heating inside the fuel cell is detected.

The cooling fin may be a corrugated plate including concave grooves configured to function as a refrigerant flow path.

As the cooling fin, for example, a corrugated metal plate obtained by folding a metal plate may be used. The surface of the cooling fin may be subjected to conductive treatment with silver, nickel, carbon or the like.

The concave grooves of the cooling fin may be formed by folding the metal plate.

The depth of the concave grooves may be from 1.0 mm to 2.0 mm, for example.

The metal plate may be folded to form concave grooves with a depth of from 1.0 mm to 2.0 mm at a pitch of from 1.0 mm to 2.0 mm, for example, thereby preparing the corrugated cooling fin.

As long as the cooling fin is disposed between the adjacent unit fuel cells, the cooling fin may be disposed in at least a part of the region in the planar direction between the adjacent unit fuel cells.

The cooling fin may be disposed in a region which is between the unit fuel cells adjacent to each other in the planar direction and which faces at least the MEGA.

The cooling fin may be disposed in a region which is other than the region where the gasket is disposed between the unit fuel cells adjacent to each other in the planar direction.

The cooling fin may include a protrusion protruding from the unit fuel cell.

The shape of the cooling fin may be a rectangular shape, a horizontal hexagon shape, a horizontal octagon shape, a circular shape or a long circular shape, for example.

The first temperature acquirer is disposed at the position which is near the cooling air inlet of the fuel cell and which is apart from the cooling fin.

The first temperature acquirer measures the temperature of the cooling air flowing from the outside.

The first temperature acquirer is electrically connected to the controller. The controller detects the temperature of the cooling air flowing from the outside measured by the first temperature acquirer.

As the first temperature acquirer, a conventionally-known temperature sensor, a thermometer or the like may be used.

If the first temperature acquirer is in contact with the components of the fuel cell, the temperature varies along with an increase in the temperature of the fuel cell. Accordingly, to accurately measure the temperature of the cooling air flowing from the outside, the first temperature acquirer is disposed thermally apart from the components of the fuel cell.

The position to dispose the first temperature acquirer is not particularly limited, as long as a temperature equivalent to the temperature of the cooling air flowing into the fuel cell system, can be measured.

The second temperature acquirer is disposed to come into contact with the cooling fin.

The second temperature acquirer measures the temperature of the fuel cell.

When the second temperature acquirer is apart from the components of the fuel cell, heat conduction is slow. heat conduction is especially slow when air mediates between the second temperature acquirer and the components as the refrigerant and when the flow rate of the cooling air decreases. Accordingly, by bringing the second temperature acquirer into contact with the cooling fin which is made of a metal and has good heat conduction, the temperature of the unit fuel cells around the cooling fin is quickly acquired.

The second temperature acquirer is electrically connected to the controller. The controller detects the temperature of the fuel cell measured by the second temperature acquirer.

As the second temperature acquirer, a conventionally-known temperature sensor, a thermometer or the like may be used.

The attachment position of the second temperature acquirer may be as follows. If the attachment position is near the collector plates disposed at the ends of the fuel cell, the heat capacity of the fuel cell is large, and a response to a change in the fuel cell temperature is delayed. Accordingly, the second temperature acquirer may be disposed to come into contact with the cooling fin disposed between any two of the second and subsequent unit fuel cells inside from the end. The second temperature acquirer may be inserted between the cooling fin disposed between the unit fuel cells and the contact portion of the ribs of the separator.

The attachment position of the second temperature acquirer may be on the first separator side of the cooling fin, or it may be on the second separator side of the cooling fin.

For example, if the gap between the unit fuel cells is narrow and the second temperature acquirer cannot be inserted therebetween, the attachment position of the second temperature acquirer may be as follows. A protrusion protruding from the unit fuel cell is disposed in the cooling fin, and the second temperature acquirer may be attached to the protrusion of the cooling fin.

Several second temperature acquirer may be disposed for better temperature detection accuracy and detection of a local abnormality or the like in the fuel cell.

The second temperature acquirer may be disposed near the position where the fuel cell temperature reaches the maximum temperature.

As the air system, the air-cooled fuel cell system includes the air introducer.

The air-cooled fuel cell system may include the air introducer. The air introducer takes in air from the outside of the air-cooled fuel cell system.

The air introducer may be an air inlet, for example.

A pressure loss unit may be disposed in the air introducer. As the pressure loss unit, examples include, but are not limited to, a filter.

The air introducer may include an air divider. The air divider divides the air taken in from the outside into the reaction air and the cooling air before the air is introduced to the fuel cell. The air divider is not always necessary when a reaction air introducer configured to take in the reaction air from the outside and a cooling air introducer configured to take in the cooling air from the outside, are disposed as the air introducer.

The air divider may divide the air into the reaction air and the cooling air at a flow rate ratio of from 1:20 to 1:50.

For example, the air divider may be a housing capable of taking in air. The material for the housing is not particularly limited, and it may be a metal, a resin or a carbonaceous material, for example.

The fuel cell system includes the cooling system of the fuel cell.

The cooling system may include the cooling air supply flow path.

The cooling air supply flow path connects the air introducer and the cooling air inlet of the fuel cell. The cooling air inlet may be a refrigerant supply hole, a cooling air inlet manifold, or the like.

The cooling system may include the cooling air discharge flow path.

The cooling air discharge flow path connects the cooling air outlet of the fuel cell and the outside. The cooling air outlet may be a refrigerant discharge hole, a cooling air outlet manifold, or the like.

The cooling air discharge flow path may include a refrigerant driver.

The refrigerant driver is electrically connected to the controller. The refrigerant driver is operated according to a control signal from the controller. The flow rate of the refrigerant supplied from the refrigerant driver to the fuel cell is controlled by the controller. The temperature of the fuel cell may be controlled thereby.

As the refrigerant driver, examples include, but are not limited to, an air pump, an air compressor, an air blower and an air fan.

In the cooling system, by disposing the refrigerant driver on the cooling air outlet side, the pressure inside the cooling air manifold of the fuel cell is controlled to atmospheric pressure or less.

The structure of the cooling system is an atmospheric release structure having no valve, and the pressure of the cooling air is equal to the outside pressure (e.g., −0.01 kPaG to −0.3 kPaG). Accordingly, the fuel cell structure is prevented from being exposed to stress associated with pressure difference, and the use of a lightweight, inexpensive housing material is allowed. More specifically, the cooling air supply flow path and/or the cooling air discharge flow path may be a pipe.

The fuel cell system includes an oxidant gas system (a reaction air system).

The oxidant gas system may include the reaction air supplier, the reaction air supply flow path, the reaction air discharge flow path, a reaction air bypass flow path, a bypass valve, a reaction air flow rate sensor and so on. More specifically, the reaction air supply flow path, the reaction air discharge flow path and/or the reaction air bypass flow path may be a pipe.

The reaction air supplier supplies the reaction air to the fuel cell. More specifically, the reaction air supplier supplies the reaction air to the cathode of the fuel cell.

The sealed volume of the oxidant gas system may be 5 times or less the sealed volume of a fuel gas system.

As the reaction air supplier, examples include, but are not limited to, an air pump, an air compressor, an air blower and an air fan.

In the oxidant gas system, the reaction air supplier is independently disposed before the introduction of the reaction air into the fuel cell. By independently disposing the refrigerant driver and the reaction air supplier in the cooling system and the oxidant gas system, respectively, the flow rate of the cooling air and that of the reaction air is independently controlled; the water discharge properties and the humidity is precisely controlled; and the power generation performance of the fuel cell is increased.

The reaction air supplier is electrically connected to the controller. The reaction air supplier is operated according to a control signal from the controller. At least one selected from the group consisting of the flow rate and pressure of the reaction air supplied from the reaction air supplier to the cathode, may be controlled by the controller.

The reaction air supply flow path connects the reaction air supplier and the reaction air inlet of the fuel cell. The reaction air supply flow path allows the reaction air to be supplied from the reaction air supplier to the cathode of the fuel cell. The reaction air inlet may be the oxidant gas supply hole, the cathode inlet manifold, or the like. The reaction air supply flow path may branch from the air divider.

The reaction air supply flow path comprises the first valve in the region downstream of the reaction air supplier and upstream of the reaction air inlet of the fuel cell.

The first valve may be directly disposed at the reaction air inlet of the fuel cell.

The first valve may be disposed upstream of the reaction air supplier.

The first valve is electrically controlled to the controller. By opening the first valve by the controller, the reaction air is supplied from the reaction air supply flow path to the reaction air inlet of the fuel cell.

A pressure loss unit may be disposed upstream of the reaction air supplier of the reaction air supply flow path. As the pressure loss unit, examples include, but are not limited to, a filter. As the pressure loss unit disposed in the reaction air supply flow path, for example, a filter which is finer and higher in pressure loss than the pressure loss unit disposed in the air introducer, may be used. By cleaning the whole of the air introduction system, the energy loss of the fuel cell is increased. However, by cleaning only the oxidant gas system, the energy loss of the fuel cell is suppressed. By virtue of the use of the finer filter, the contamination of the cooling air is reduced, and the durability of the fuel cell is increased.

The reaction air discharge flow path connects the reaction air outlet of the fuel cell and the outside of the air-cooled fuel cell system. The reaction air discharge flow path allows the reaction air, which is discharged from the cathode of the fuel cell, to be discharged to the outside of the air-cooled fuel cell system. The reaction air outlet may be the oxidant gas discharge hole, the cathode outlet manifold, or the like.

The reaction air discharge flow path comprises the second valve downstream of the reaction air outlet of the fuel cell. The second valve may be a sealing valve or an oxidant gas pressure control valve.

The second valve is electrically connected to the controller. By opening the second valve by the controller, the reaction air is discharged to the outside from the reaction air discharge flow path. The pressure of the reaction air supplied to the cathode (cathode pressure) may be controlled by controlling the opening degree of the second valve.

The reaction air bypass flow path branches from the reaction air supply flow path, bypasses the fuel cell, and connects the branch of the reaction air supply flow path and the junction of the reaction air discharge flow path.

The bypass valve is disposed in the reaction air bypass flow path.

The bypass valve is electrically connected to the controller. By opening the bypass valve by the controller, when the supply of the reaction air to the fuel cell is unnecessary, the reaction air is allowed to bypass the fuel cell and be discharged to the outside from the reaction air discharge flow path. The first valve may be a three-way valve, so that the first valve also functions as a bypass valve.

The reaction air flow rate sensor may be disposed in the reaction air supply flow path.

The reaction air flow rate sensor detects the flow rate of the reaction air in the oxidant gas system. The reaction air flow rate sensor is electrically connected to the controller. The controller may estimate the rotational speed of the air compressor from the flow rate of the reaction air detected by the reaction air flow rate sensor. The reaction air flow rate sensor may be disposed upstream from the reaction air supplier of the reaction air supply flow path.

As the reaction air flow rate sensor, a conventionally-known flow meter or the like may be used.

For the oxidant gas system, by the inlet-side reaction air supplier and the second valve, the pressure inside the reaction air manifold of the fuel cell can be a pressure that is equal to or more than atmospheric pressure (e.g., 5 kPaG to 15 kPaG).

The pressure of the reaction air is increased by the second valve of the oxidant gas system. Accordingly, the fuel cell performance is increased by increased oxygen partial pressure and prevention of drying of the fuel cell.

When the oxidant gas system and the cooling system are not separated, it is also necessary to increase the pressure of the cooling air which is at a flow rate that is approximately 30 times the flow rate of the reaction air. As a result, the energy loss which is produced when the oxidant gas system and the cooling system are not separated, is 30 or more times larger than the energy loss which is produced when the oxidant gas system and the cooling system are separated.

The fuel cell system includes a fuel gas system.

The fuel gas system supplies fuel gas to the fuel cell.

The fuel gas system includes a fuel gas supplier.

The fuel gas supplier supplies the fuel gas to the anode of the fuel cell.

As the fuel gas supplier, examples include, but are not limited to, a fuel tank such as a liquid hydrogen tank and a compressed hydrogen tank.

The fuel gas supplier is electrically connected to the controller. In the fuel gas supplier, ON/OFF of the fuel gas supply to the fuel cell may be controlled by controlling the opening and closing of the main shutoff valve of the fuel gas supplier according to a control signal from the controller.

The fuel gas system includes the fuel gas supply flow path. More specifically, the fuel gas supply flow path may be a pipe.

The fuel gas supply flow path connects the fuel gas supplier and the fuel gas inlet of the fuel cell. The fuel gas supply flow path allows the fuel gas to be supplied to the anode of the fuel cell. The fuel gas inlet may be the fuel gas supply hole, the anode inlet manifold, or the like.

The fuel gas supply flow path comprises the third valve upstream of the fuel gas inlet of the fuel cell.

The third valve may be directly disposed at the fuel gas inlet of the fuel cell.

The third valve may be disposed upstream of an ejector.

The third valve is electrically connected to the controller. By opening the third valve by the controller, the fuel gas is supplied from the fuel gas supply flow path to the fuel gas inlet of the fuel cell.

In the fuel gas supply flow path, the ejector may be disposed.

For example, the ejector may be disposed at a junction with a circulation flow path on the fuel gas supply flow path. The ejector supplies a mixed gas containing fuel gas and circulation gas to the anode of the fuel cell. As the ejector, a conventionally-known ejector may be used.

A pressure control valve and a medium-pressure hydrogen sensor may be disposed in a region between the fuel gas supplier and ejector of the fuel gas supply flow path.

The pressure control valve controls the pressure of the fuel gas supplied from the fuel gas supplier to the ejector.

The pressure control valve is electrically connected to the controller. The pressure of the fuel gas supplied to the ejector may be controlled by controlling the opening/closing, opening degree or the like of the pressure control valve by the controller.

The medium-pressure hydrogen sensor is electrically connected to the controller. The controller detects the fuel gas pressure measured by the medium-pressure hydrogen sensor. The pressure of the fuel gas supplied to the ejector may be controlled by controlling the opening/closing, opening degree or the like of the pressure control valve, based on the detected pressure.

The fuel gas system includes the fuel off-gas discharge flow path. More specifically, the fuel off-gas discharge flow path may be a pipe.

The fuel off-gas discharge flow path connects the fuel gas outlet of the fuel cell and the outside of the fuel cell system.

In the fuel off-gas discharge flow path, a gas-liquid separator may be disposed in a region between the fuel gas outlet and the outside of the fuel cell system.

The fuel off-gas discharge flow path may branch from the circulation flow path through the gas-liquid separator.

The fuel off-gas discharge flow path discharges, to the outside of the fuel cell system, the fuel off-gas discharged from the fuel gas outlet of the fuel cell. The fuel gas outlet may be the fuel gas discharge hole, the anode outlet manifold, or the like.

The fuel off-gas discharge flow path comprises the fourth valve (a fuel off-gas discharge valve or a gas and water discharge valve) downstream of the fuel gas outlet of the fuel cell.

The fourth valve may be directly disposed at the fuel gas outlet of the fuel cell.

The fourth valve may be disposed downstream from the gas-liquid separator in the fuel off-gas discharge flow path.

The fourth valve allows the fuel off-gas, water and the like to be discharged to the outside (of the system). The outside may be the outside of the fuel cell system, or it may be the outside of the vehicle.

The fourth valve may be electrically connected to the controller, and the flow rate of the fuel off-gas discharged to the outside and the flow rate of the discharged water (liquid water) may be controlled by controlling the opening and closing of the fourth valve by the controller. By controlling the opening degree of the fourth valve, the pressure of the fuel gas supplied to the anode of the fuel cell (anode pressure) may be controlled.

The fuel off-gas may contain the fuel gas that has passed through the anode without reacting, and the water generated at the cathode and delivered to the anode. In some cases, the fuel off-gas contains corroded substances generated in the catalyst layer, the electrolyte membrane or the like, and the oxidant gas or the like allowed to be supplied to the anode during a purge.

The fuel gas system may include the circulation flow path. More specifically, the circulation flow path may be a pipe.

The circulation flow path may connect the fuel gas outlet of the fuel cell and the ejector.

The circulation flow path may branch from the fuel off-gas discharge flow path and connect to the ejector disposed in the fuel gas supply flow path, thereby merging with the fuel gas supply flow path.

The circulation flow path may branch from the fuel off-gas discharge flow path through the gas-liquid separator and connect to the ejector disposed in the fuel gas supply flow path, thereby merging with the fuel gas supply flow path.

The circulation flow path allows the fuel off-gas, which is the fuel gas discharged from the fuel gas outlet of the fuel cell, to be recovered and supplied to the fuel cell as the circulation gas.

A gas circulation pump may be disposed in the circulation flow path. The gas circulation pump circulates the fuel off-gas as the circulation gas. The gas circulation pump may be electrically connected to the controller, and the flow rate of the circulation gas may be controlled by controlling ON/OFF, rotational speed, etc., of the gas circulation pump by the controller.

The gas-liquid separator (anode gas-liquid separator) may be disposed in the circulation flow path.

The gas-liquid separator may be disposed at the branch point of the fuel off-gas discharge flow path and the circulation flow path. Accordingly, the flow path from the fuel gas outlet to the gas-liquid separator may be the fuel off-gas discharge flow path or the circulation flow path.

The gas-liquid separator is disposed upstream from the fourth valve of the fuel off-gas discharge flow path.

The gas-liquid separator separates the water (liquid water) and the fuel off-gas which is the fuel gas discharged from the fuel gas outlet. Accordingly, the fuel off-gas may be returned to the circulation flow path as the circulation gas, or unnecessary gas, water and the like may be discharged to the outside by opening the gas and water discharge valve of the fuel off-gas discharge flow path. In addition, by the gas-liquid separator, the flow of excess water into the circulation flow path is suppressed. Accordingly, the occurrence of freezing of the circulation pump or the like due to the water, is suppressed.

The fuel cell system may include a secondary cell.

The secondary cell (battery) may be any chargeable and dischargeable battery. For example, it may be a conventionally-known secondary cell such as a nickel-hydrogen secondary cell and a lithium ion secondary cell. The secondary cell may include a power storage element such as an electric double layer capacitor. The secondary cell may have a structure such that a plurality of secondary cells are connected in series. The secondary cell supplies power to a motor, an air compressor and the like. The secondary cell may be chargeable by a power source outside the vehicle. The secondary cell may be charged by the output power of the fuel cell. The charge and discharge of the secondary cell may be controlled by the controller.

The controller physically includes a processing unit such as a central processing unit (CPU), a memory device such as a read-only memory (ROM) and a random access memory (RAM), and an input-output interface. The ROM is used to store a control program, control data and so on to be processed by the CPU, and the RAM is mainly used as various workspaces for control processing. The controller may be a control device such as an electronic control unit (ECU).

The controller may be electrically connected to an ignition switch which may be mounted in the vehicle. The controller may be operable by an external power source even if the ignition switch is turned OFF.

The controller monitors the temperatures acquired by the first and second temperature acquirers. The controller may monitor the temperatures acquired by the first and second temperature acquirers during the operation of the fuel cell.

When the difference between the temperatures acquired by the first and second temperature acquirers is the predetermined temperature threshold or more, or when the difference between temperature increase rates acquired by the first and second temperature acquirers is the predetermined temperature increase rate threshold or more, the controller stops power generation of the fuel cell.

An abnormality in the fuel cell is determined by checking the temperature difference between the temperatures acquired by the first and second temperature acquirers or by checking the difference between the temperature increase rates.

When there is an abnormality, along with an increase in fuel cell temperature, the temperature difference $\Delta T12$ between the temperature T1 acquired by the first temperature acquirer and the temperature T2 acquired by the second temperature acquirer rapidly increases. When the temperature difference $\Delta T12$ reaches a threshold of abnormality determination, it is quickly determined that there is an abnormality. Even in the case of using the temperature increase rate (the slope of a temperature graph) as a characteristic value of abnormality determination, a similar conclusion is reached.

When the difference between the temperatures acquired by the first and second temperature acquirers is the predetermined temperature threshold or more, or when the difference between the temperature increase rates acquired by the first and second temperature acquirers is the predetermined temperature increase rate threshold or more, the controller may decrease the opening degrees of the first, second, third and fourth valves.

The controller may close the first, second, third and fourth valves when the power generation of the fuel cell is stopped.

The predetermined temperature threshold and the predetermined temperature increase rate threshold may be appropriately set depending on the performance and power generation state (generated heat amount) of the fuel cell.

FIG. 1 is an exploded perspective view of an example of a part of the fuel cell of the present disclosure.

The fuel cell includes an assembly 18 including a unit fuel cell 11, a cooling fin 15 and a gasket 16.

The unit fuel cell 11 includes a first separator 12, a resin frame 14 in which a MEGA is disposed in its opening, and a second separator 13 in this order.

The cooling fin 15 is disposed in a region which is other than the region where the gasket 16 is disposed on a surface of the second separator 13 of the unit fuel cell 11, and which faces the MEGA.

The gaskets 16 are disposed around manifolds 17 on the cooling fin 15-side surface of the second separator 13.

In the first separator 12, the resin frame 14 and the second separator 13, an oxidant gas supply hole, an oxidant gas discharge hole, a fuel gas supply hole and a fuel gas discharge hole are disposed, all of which are the manifolds 17 through which reaction air (oxidant gas) and hydrogen (fuel gas) flow as indicated by arrows.

In the cooling fin 15, concave grooves are disposed, all of which serve as a refrigerant flow path through which cooling air (refrigerant) flow as indicated by arrows.

In the cooling fin 15, the second temperature acquirer T2 is disposed at the end downstream of the flow direction of the cooling air.

The fuel cell may have the structure that the refrigerant flows on the side surface.

Figure 2:
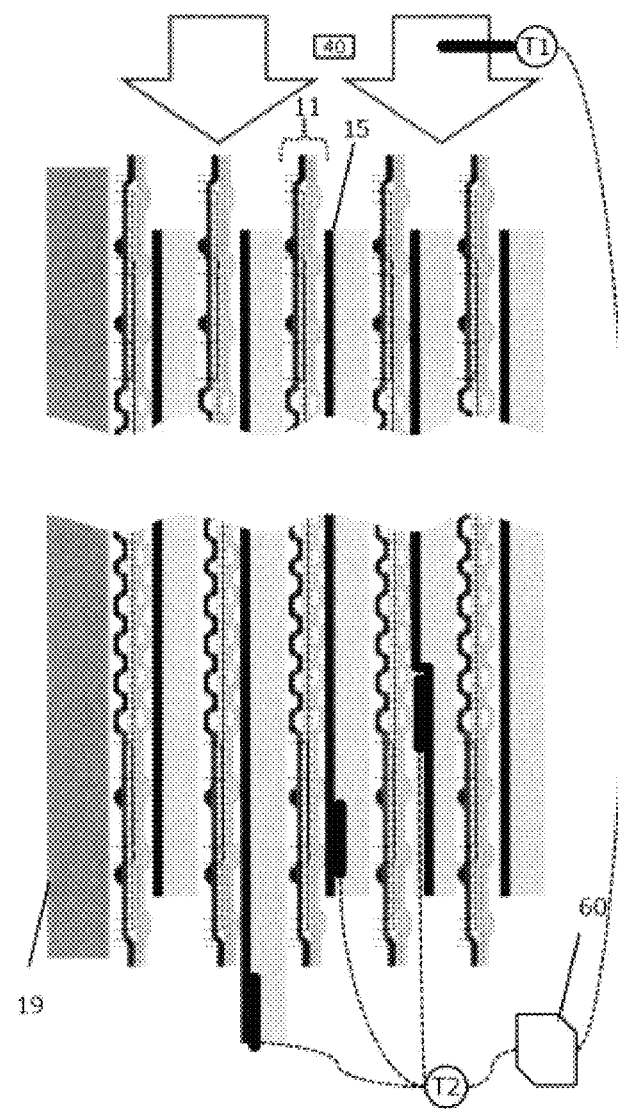
FIG. 2 is a schematic sectional diagram of an example of a part of the fuel cell of the present disclosure.

FIG. 2 is a schematic sectional diagram of an example of a part of the fuel cell of the present disclosure.

As shown in FIG. 2, the cooling fin 15 is disposed between adjacent unit fuel cells 11.

The first temperature acquirer T1 is disposed upstream from the fuel cell of a flow of the cooling air in a cooling system 40.

In the cooling fin 15, several second temperature acquirers T2 are disposed at the end downstream of the flow direction of cooling air.

The second temperature acquirers T2 are disposed to come into contact with the cooling fin 15 disposed between any two of the second and subsequent unit fuel cells inside from a collector plate 19 disposed at the stacking-direction end of the fuel cell.

One of the second temperature acquirers T2 is inserted between the cooling fin 15 and the contact position of the ribs of the separator.

One of the second temperature acquirers T2 is disposed at the protrusion of the cooling fin 15, which protrudes from the outer end of the fuel cell in the direction of the cooling air flow path.

The first temperature acquirer T1 and the second temperature acquirers T2 are electrically connected to the controller 60.

Figure 3:
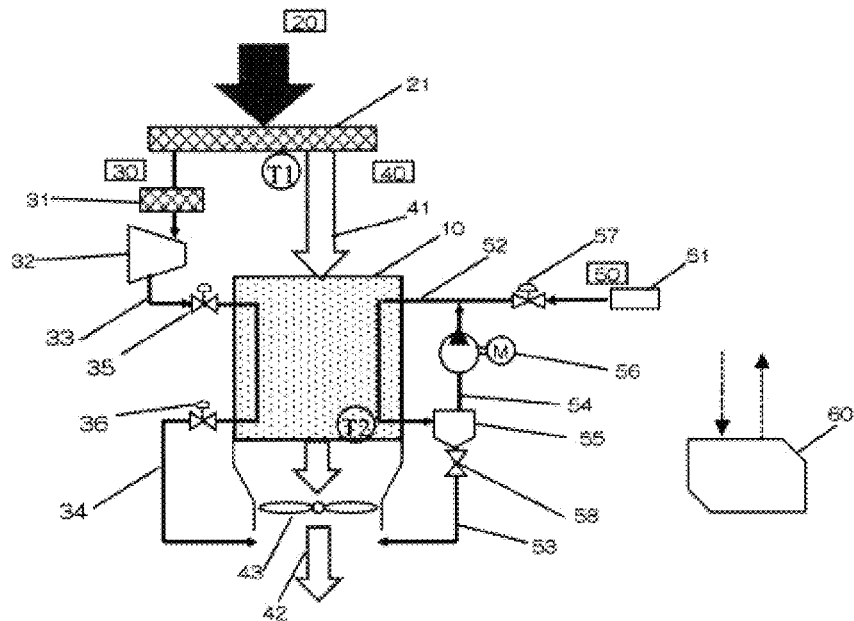
FIG. 3 is a schematic configuration diagram of an example of the air-cooled fuel cell system of the present disclosure.

FIG. 3 is a schematic configuration diagram of an example of the air-cooled fuel cell system of the present disclosure.

The air-cooled fuel cell system shown in FIG. 3 includes a fuel cell 10, an air system 20, an oxidant gas system 30, a cooling system 40, a fuel gas system 50, a controller 60, the first temperature acquirer T1 and the second temperature acquirer T2.

The air system 20 includes an air introducer 21 including a filter and an air divider.

The air introducer 21 takes in air, and the air is distributed to the oxidant gas system 30 and the cooling system 40 by the air divider.

The oxidant gas system 30 includes a filter 31, a reaction air supplier 32, a reaction air supply flow path 33, a reaction air discharge flow path 34, a first valve 35 and a second valve 36.

In the reaction air supply flow path 33, the filter 31, the reaction air supplier 32 and the first valve 35 are disposed along the direction of air flow.

The second valve 36 is disposed in the reaction air discharge flow path 34.

The cooling system 40 includes a cooling air supply flow path 41, a cooling air discharge flow path 42 and a refrigerant driver 43.

The fuel gas system 50 includes a fuel gas supplier 51, a fuel gas supply flow path 52, a fuel off-gas discharge flow path 53, a circulation flow path 54, a gas-liquid separator 55, a gas circulation pump 56, a third valve 57 (such as an injector) and a fourth valve 58 (such as a purge valve).

The first temperature acquirer T1 is disposed in the cooling air supply flow path 41 and measures the temperature of the cooling air flowing through the cooling air supply flow path 41.

The first temperature acquirer T1 is electrically connected to the controller 60. The controller 60 detects the flowing cooling air temperature measured by the first temperature acquirer T1.

The second temperature acquirer T2 is disposed in the fuel cell 10 to come into contact with the cooling fin, and it measures the temperature of the fuel cell 10.

The second temperature acquirer T2 acquires the temperature of the fuel cell 10. The controller 60 detects the temperature of the fuel cell 10 acquired by the second temperature acquirer T2.

Figure 4:
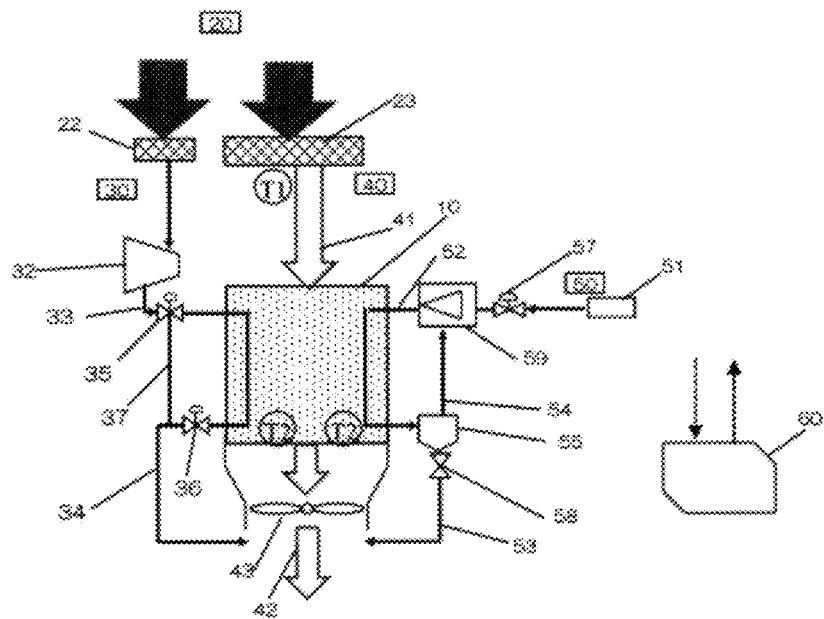
FIG. 4 is a schematic configuration diagram of another example of the air-cooled fuel cell system of the present disclosure.

FIG. 4 is a schematic configuration diagram of another example of the air-cooled fuel cell system of the present disclosure. Of the components shown in FIG. 4, the same components as FIG. 3 are allotted with the same numbers as FIG. 3 and will not be described here for simplicity.

In the air-cooled fuel cell system of FIG. 4, the air system 20 includes a reaction air introducer 22 configured to supply air to the oxidant gas system 30, and a cooling air introducer 23 configured to supply air to the cooling system 40. Each of the reaction air introducer 22 and the cooling air introducer 23 includes a filter.

Each of the oxidant gas system 30 and the cooling system 40 takes in air from the atmosphere through the filter.

The oxidant gas system 30 includes a filter 31, a reaction air supplier 32, a reaction air supply flow path 33, a reaction air discharge flow path 34, a first valve 35, a second valve 36 and a reaction air bypass flow path 37.

In the reaction air supply flow path 33, the filter 31, the reaction air supplier 32 and the first valve 35 are disposed along the direction of air flow. The first valve 35 is a three-way valve and allows the reaction air to bypass the fuel cell 10 and flow from the reaction air bypass flow path 37 to the reaction air discharge flow path 34.

The second valve 36 is disposed in the reaction air discharge flow path 34.

Also in FIG. 4, a fuel gas system 50 includes a fuel gas supplier 51, a fuel gas supply flow path 52, a fuel off-gas discharge flow path 53, a circulation flow path 54, a gas-liquid separator 55, a third valve 57 (such as an injector), a fourth valve 58 (such as a purge valve) and an ejector 59.

The second temperature acquirers T2 are disposed in the fuel cell 10 to come into contact with the cooling fin.

Figure 5:
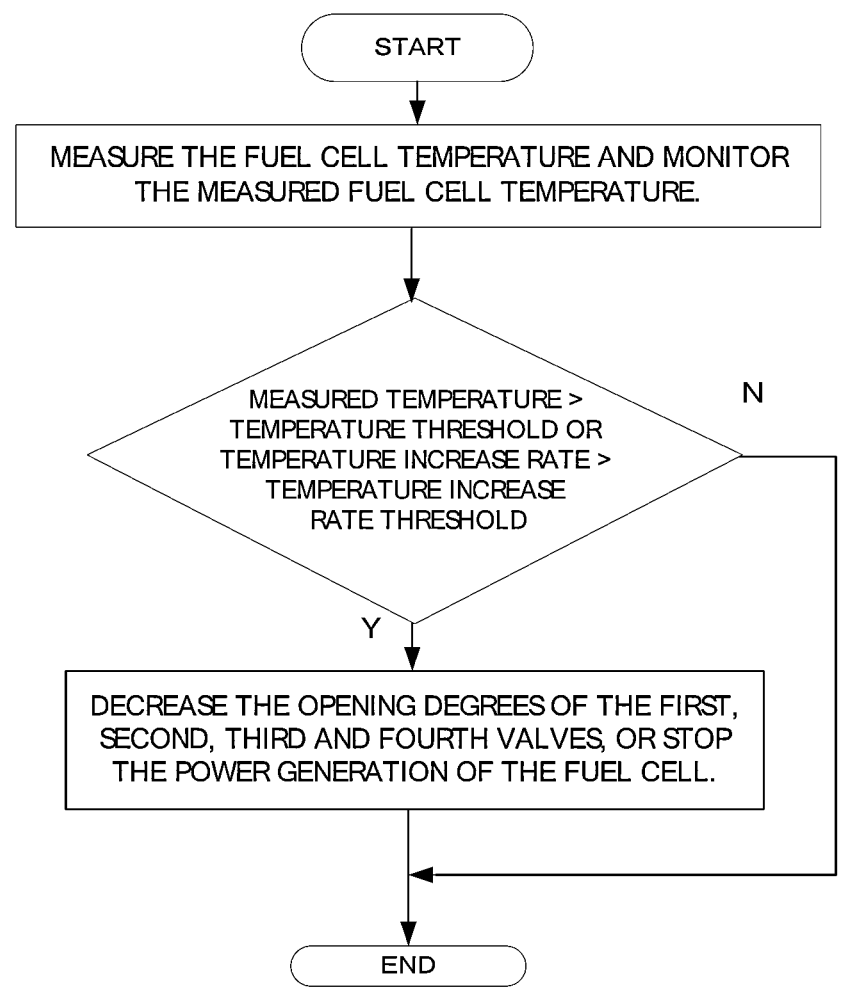
FIG. 5 is a flowchart of an example of the control of the air-cooled fuel cell system of the present disclosure.

FIG. 5 is a flowchart of an example of the control of the air-cooled fuel cell system of the present disclosure.

The controller monitors the temperatures acquired by the first and second temperature acquirers during the operation of the fuel cell.

The controller determines whether or not the difference between the temperatures acquired by the first and second temperature acquirers is the predetermined temperature threshold or more, or whether or not the difference between the temperature increase rates acquired by the first and second temperature acquirers is the predetermined temperature increase rate threshold or more.

When the difference between the temperatures acquired by the first and second temperature acquirers is the predetermined temperature threshold or more, or when the difference between the temperature increase rates acquired by the first and second temperature acquirers is the predetermined temperature increase rate threshold or more, the controller decreases the opening degrees of the first, second, third and fourth valves smaller than the opening degrees thereof at the time of determination, or the controller stops the power generation of the fuel cell. The controller may close the first, second, third and fourth valves when the power generation of the fuel cell is stopped. On the other hand, when the difference between the temperatures acquired by the first and second temperature acquirers is less than the predetermined temperature threshold, or when the difference between the temperature increase rates acquired by the first and second temperature acquirers is less than the predetermined temperature increase rate threshold, the controller may end the control or may maintain the status quo.

When overheating occurs, the valve of the reaction air system may be sealed. Accordingly, the voltage of the fuel cell is decreased by the oxygen deficiency of the fuel cell, and the power generation of the fuel cell is safely stopped. In addition, the degradation of the fuel cell is suppressed. Even when a fire occurs inside the fuel cell, the spread of the fire is prevented by oxygen shut-off.

Since the amount of hydrogen in moles of the sealed fuel gas system is increased more than twice the amount of oxygen in moles of the sealed reaction air system, the oxygen inside the fuel cell system is consumed, and the voltage of the fuel cell is decreased. Since the inside of the fuel cell is sealed in a hydrogen-rich state, the progression of the degradation of fuel cell is slowed. For complete consumption of the oxygen, the reaction air system may be sealed; the fuel gas supply may be continued for a predetermined amount of time; and then after the oxygen is consumed to a certain extent, the fuel gas system may be sealed. That is, the first and second valves are closed, and then after the elapse of a predetermined amount of time, the third and fourth valves may be closed.

REFERENCE SIGNS LIST

10. Fuel cell
11. Unit fuel cell
12. First separator
13. Second separator
14. Resin frame
15. Cooling fin
16. Gasket
17. Manifold
18. Assembly
19. Collector plate
20. Air system
21. Air introducer
22. Reaction air introducer
23. Cooling air introducer
30. Oxidant gas system
31. Filter
32. Reaction air supplier
33. Reaction air supply flow path
34. Reaction air discharge flow path 35. First valve
36. Second valve
37. Reaction air bypass flow path
40. Cooling system
41. Cooling air supply flow path
42. Cooling air discharge flow path
43. Refrigerant driver
50. Fuel gas system
51. Fuel gas supplier
52. Fuel gas supply flow path
53. Fuel off-gas discharge flow path
54. Circulation flow path
55. Gas-liquid separator
56. Gas circulation pump
57. Third valve
58. Fourth valve
59. Ejector
60. Controller
T1. First temperature acquirer
T2. Second temperature acquirer

The invention claimed is:

1. An air-cooled fuel cell system,
wherein the air-cooled fuel cell system comprises:
a fuel cell,
a first temperature acquirer,
a second temperature acquirer and
a controller;
wherein the fuel cell comprises a cooling fin made of a metal;
wherein the first temperature acquirer is disposed at a position which is near a cooling air inlet of the fuel cell and which is apart from the cooling fin;
wherein the second temperature acquirer is disposed to come into contact with the cooling fin;
wherein the controller monitors temperatures acquired by the first and second temperature acquirers; and
wherein, when a difference between the temperatures acquired by the first and second temperature acquirers is a predetermined temperature threshold or more, or when a difference between temperature increase rates acquired by the first and second temperature acquirers is a predetermined temperature increase rate threshold or more, the controller stops power generation of the fuel cell.

2. The air-cooled fuel cell system according to claim 1, wherein the air-cooled fuel cell system further comprises:
an air introducer configured to take in air from the outside of the air-cooled fuel cell system,
a reaction air supplier configured to supply reaction air to the fuel cell,
a reaction air supply flow path configured to connect the reaction air supplier and a reaction air inlet of the fuel cell,
a reaction air discharge flow path configured to connect a reaction air outlet of the fuel cell and the outside,
a cooling air supply flow path configured to connect the air introducer and the cooling air inlet of the fuel cell,
a fuel gas supplier configured to supply fuel gas to the fuel cell,
a fuel gas supply flow path configured to connect the fuel gas supplier and a fuel gas inlet of the fuel cell, and
a fuel off-gas discharge flow path configured to connect a fuel gas outlet of the fuel cell and the outside;
wherein the fuel cell has a structure that a reaction air manifold and a cooling air manifold are independent of each other;
wherein the reaction air supply flow path comprises a first valve in a region downstream of the reaction air supplier and upstream of the reaction air inlet of the fuel cell;
wherein the reaction air discharge flow path comprises a second valve downstream of the reaction air outlet of the fuel cell;
wherein the fuel gas supply flow path comprises a third valve upstream of the fuel gas inlet of the fuel cell;
wherein the fuel off-gas discharge flow path comprises a fourth valve downstream of the fuel gas outlet of the fuel cell; and
wherein, when a difference between the temperatures acquired by the first and second temperature acquirers is a predetermined temperature threshold or more, or when a difference between temperature increase rates acquired by the first and second temperature acquirers is a predetermined temperature increase rate threshold or more, the controller decreases opening degrees of the first, second, third and fourth valves.

* * * * *